(12) United States Patent
Taguchi et al.

(10) Patent No.: US 9,033,512 B2
(45) Date of Patent: May 19, 2015

(54) PROJECTION DISPLAY HAVING LED ARRAYS CONTROLLED TO TURN ON/OFF A SAME SHAPED GROUP OF LEDS

(71) Applicants: Hirokazu Taguchi, Tokyo (JP); Kimito Nishikawa, Tokyo (JP)

(72) Inventors: Hirokazu Taguchi, Tokyo (JP); Kimito Nishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 136 days.

(21) Appl. No.: 13/741,862

(22) Filed: Jan. 15, 2013

(65) Prior Publication Data

US 2013/0308065 A1 Nov. 21, 2013

(30) Foreign Application Priority Data

May 15, 2012 (JP) ................. 2012-111732

(51) Int. Cl.
*G03B 21/20* (2006.01)
*H04N 9/31* (2006.01)

(52) U.S. Cl.
CPC .......... *G03B 21/2053* (2013.01); *H04N 9/3155* (2013.01); *H04N 9/3164* (2013.01); *H04N 9/3194* (2013.01); *G03B 21/2033* (2013.01); *G03B 21/206* (2013.01); *H04N 9/3111* (2013.01); *H04N 9/3152* (2013.01)

(58) Field of Classification Search
CPC ............... G03B 21/20; G03B 21/2013; G03B 21/2033; G03B 21/2053; G03B 21/206; G03B 21/208; H04N 9/31; H04N 9/3155; H04N 9/3158; H04N 9/3161; H04N 9/3164; H04N 9/3182; H04N 9/3194

USPC ................ 353/31, 85, 94; 362/552–553, 555; 345/30, 39, 55, 82–84; 348/744
See application file for complete search history.

(56) References Cited

U.S. PATENT DOCUMENTS

| | | | |
|---|---|---|---|
| 6,369,525 B1 * | 4/2002 | Chang et al. .................. | 315/300 |
| 8,408,719 B2 * | 4/2013 | Shibasaki ....................... | 353/94 |
| 8,562,141 B2 * | 10/2013 | Ogino ............................ | 353/38 |
| 8,684,539 B2 * | 4/2014 | Suzuki ........................... | 353/85 |
| 2006/0215122 A1 * | 9/2006 | Hong .............................. | 353/31 |
| 2007/0024822 A1 * | 2/2007 | Cortenraad et al. ............ | 353/79 |
| 2008/0061716 A1 * | 3/2008 | Kim et al. ..................... | 315/307 |
| 2009/0096741 A1 * | 4/2009 | Kim .............................. | 345/102 |
| 2010/0079730 A1 | 4/2010 | Shibasaki | |
| 2012/0050697 A1 | 3/2012 | Suzuki | |
| 2012/0140186 A1 | 6/2012 | Kuwata | |

FOREIGN PATENT DOCUMENTS

| | | | |
|---|---|---|---|
| CN | 101685245 A | 3/2010 | |
| JP | 2007-322792 A | 12/2007 | |
| JP | 2011-048021 A | 3/2011 | |

* cited by examiner

*Primary Examiner* — Jori S Reilly-Diakun
(74) *Attorney, Agent, or Firm* — Birch, Stewart, Kolasch & Birch, LLP

(57) ABSTRACT

A projection type display includes an illumination optical system provided with a light source including, for respective predetermined colors, LED arrays each formed of six LEDs, a light source controller that controls the LED arrays to turn on, an integration device, and a DMD, wherein the light source controller controls the LED arrays to turn on such that the shapes of light source images, which are formed on an entrance surface of the integration device by five LEDs of the respective LED arrays, coincide with each other.

3 Claims, 7 Drawing Sheets

F I G . 5
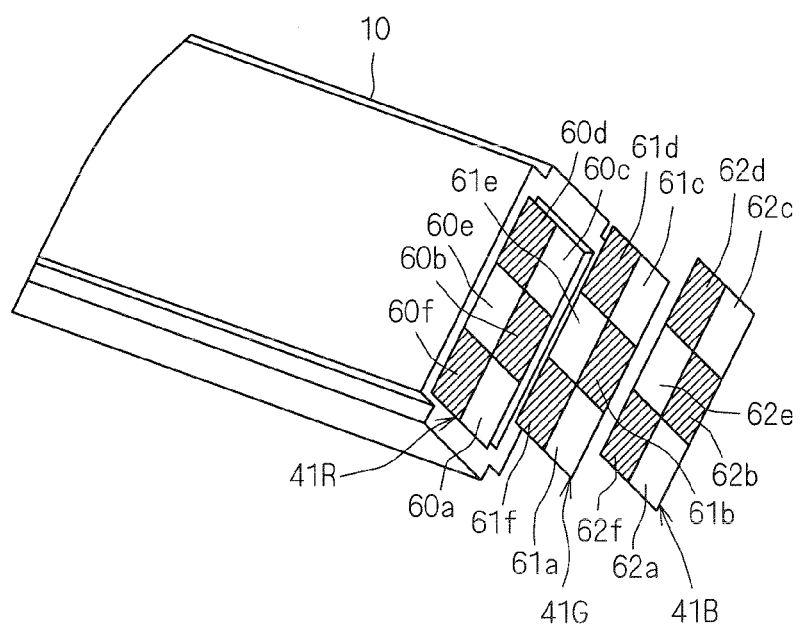

F I G . 7
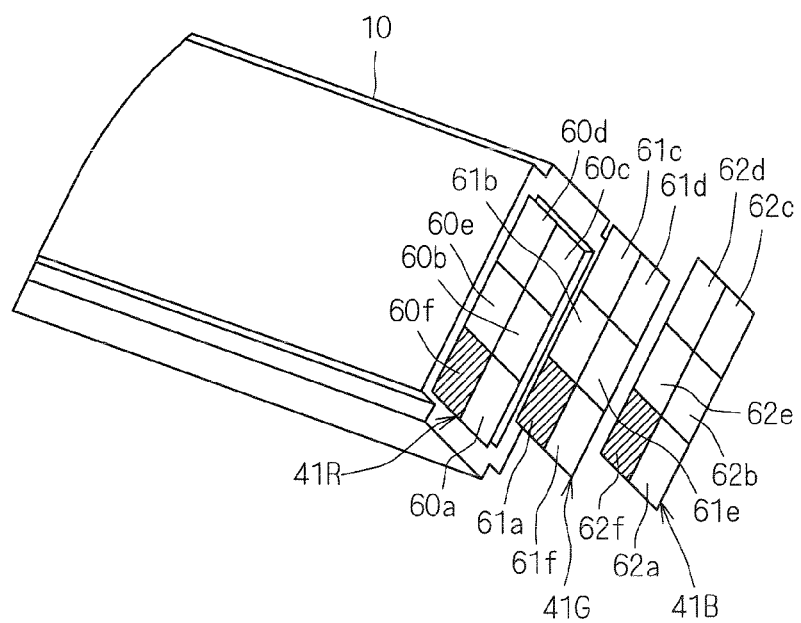

PROJECTION DISPLAY HAVING LED ARRAYS CONTROLLED TO TURN ON/OFF A SAME SHAPED GROUP OF LEDS

BACKGROUND OF THE INVENTION

1. Field of the Invention

The present invention relates to a projection type display for application to a projector that projects, for example, color video images onto a screen, and more particularly, to the improvement in uniformity of video images projected onto a screen.

2. Description of the Background Art

Conventionally, there is known a projection type display that modulates and composes illumination light beams generated by light sources based on image signals and projects those onto a screen, to thereby display video images on the screen. With increasing demands for downsizing and lower power consumption of a device and a longer life of a light source, nowadays, light emitting diodes (LEDs) have been widely used as light sources in place of conventional discharge lamps. For example, the illumination light beams from light sources composed of three LEDs respectively emitting light beams of three primary colors, red, green, and blue, are composed by a dichroic mirror, dichroic prism, or the like, and then modulated into video light by an image display device such as a digital micromirror device (DMD), whereby a color video image is projected.

The LEDs used in the projection type display as described above are classified into one type in which a light emitting part is formed of one LED and the other type in which a light emitting part is formed of an LED array including a plurality of LEDs arranged therein. In the case of the LED array, each LED array is divided into a plurality of groups, and a drive circuit is provided per group.

For example, in a case where one LED array is formed of six LEDs, a drive circuit is provided for each of the two groups each including three LEDs, or a drive circuit is provided for each of the six groups each including one LED. Driving of an LED is controlled per group, which enables to individually turn on or turn off three or one LED among the six LEDs.

The illumination light beams emitted from three LEDs respectively emitting red, green, and blue light beams or an LED array are composed from three different optical paths into one optical path by a dichroic mirror or a dichroic prism, and then radiated on an image display device such as a DMD through an integration device. The integration device is, for example, a well-known light tunnel or glass rod. The illumination light passes through the integration device while being reflected thereon, which uniformizes the illuminance distribution of the illumination light. The illuminance distribution differs depending on an entrance position of an illumination light beam on an integration device, and thus, the illuminance distributions of the respective colors do not coincide with each other, causing uneven chromaticity.

For example, Japanese Patent Application Laid-Open No. 2007-322792 proposes a device in which, in order to reduce uneven chromaticity, each of a plurality of light source units is provided with an adjustment mechanism so as to move in parallel with a direction perpendicular to the optical axis thereof, to thereby adjust the illumination light beams of the respective colors emitted from the light source units to positions with an optimum illuminance distribution with respect to a wavelength shift caused by the incident angle dependence of a cross dichroic mirror constituting a color composing unit.

In a case where LED arrays each composed of a plurality of LEDs are used as a light source in the device described in Japanese Patent Application Laid-Open No. 2007-322792, no problem arises when all the LEDs in the LED arrays are turned on. However, if LEDs to be turned off are randomly selected per LED array in a case where part of the LEDs constituting the LED array is turned off, by merely adjusting the position of the entire light source units, overlaps of the light source images do not coincide with each other when the illumination light beams respectively emitted from the LED arrays are composed. This tends to generate uneven brightness and uneven chromaticity in video images projected onto a screen.

SUMMARY OF THE INVENTION

An object of the present invention is to provide a projection type display capable of reducing uneven brightness and uneven chromaticity on video images on a screen even in a case where part of LEDs constituting an LED array is turned off.

A projection type display according to the present invention includes: an illumination optical system provided with a light source including, for respective predetermined colors, LED arrays each formed of m (m is an integer equal to or larger than two) LEDs, the illumination optical system composing fluxes of light emitted from the LED arrays into illumination light having one optical path; a light source controller that controls the LED arrays to turn on; an integration device that uniformizes the illuminance distribution of the illumination light emitted from the illumination optical system; and an image display device that modulates the illumination light emitted from said integration device into video light. The light source controller controls the LED arrays to turn on such that the shapes of light source images, each of which is formed on an entrance surface of the integration device by n (n is an integer smaller than m) LEDs of each of the LED arrays, coincide with each other.

According to the present invention, the light source controller controls the LED arrays to turn on such that the shapes of the respective light source images, which are formed on the entrance surface of the integration device by n LEDs of the respective LED arrays, coincide with each other. Accordingly, the overlaps of the light source images formed on the entrance surface of the integration device can be caused to coincide with each other. This enables to reduce, even in a case in which part of the LEDs constituting an LED array is turned off, the uneven brightness and uneven chromaticity of video images projected onto a screen.

These and other objects, features, aspects, and advantages of the present invention will become more apparent from the following detailed description of the present invention when taken in conjunction with the accompanying drawings.

BRIEF DESCRIPTION OF THE DRAWINGS

FIG. 5 is a perspective view showing an example of light source images formed on an entrance surface of an integration device of the projection type display according to the second preferred embodiment;

FIG. 7 is a perspective view showing an example of light source images formed on an entrance surface of an integration device of the projection type display according to the third preferred embodiment.

DESCRIPTION OF THE PREFERRED EMBODIMENTS

First Preferred Embodiment

Figure 1:
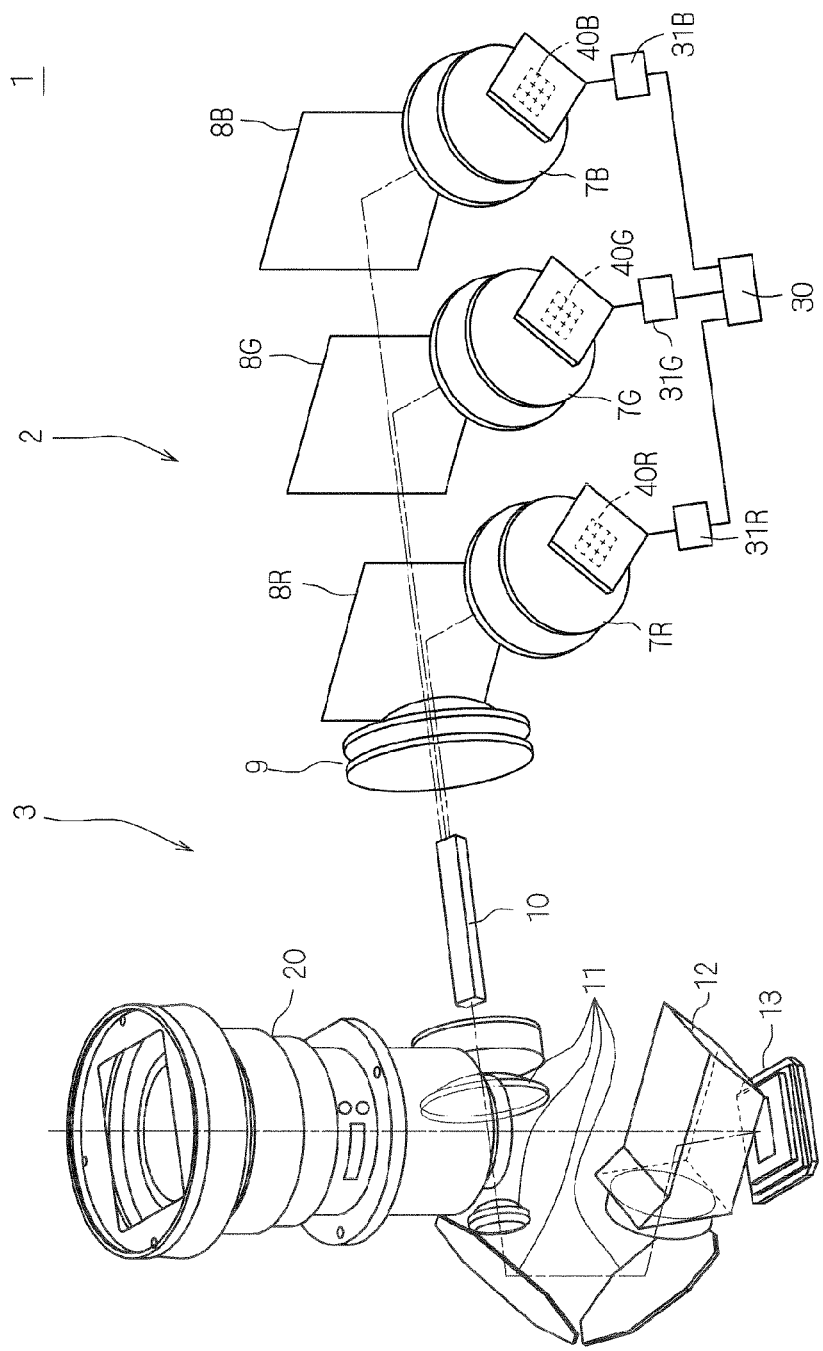
FIG. 1 is a view showing the configuration of a projection type display according to a first preferred embodiment.

A first preferred embodiment of the present invention is described below with reference to the drawings. FIG. 1 is a view showing the configuration of a projection type display 1 according to the first preferred embodiment of the present invention.

The projection type display 1 mainly includes an illumination optical system 2 including a light source, a light source controller 30, and a projection optical system 3 that converts the illumination light emitted from the illumination optical system 2 into video light and projects the video light onto a screen (not shown).

The illumination optical system 2 includes a red LED array 40R, a green LED array 40G, and a blue LED array 40B as a light source, collimator lens groups 7R, 7G, and 7B, dichroic mirrors 8R, 8G, and 8B, a condensing lens group 9, and LED drive circuits 31R, 31G, and 31B.

The LED arrays 40R, 40G, and 40B are each composed of, for example, six LEDs (more generally, m LEDs, where m is an integer equal to or larger than two). The LED drive circuits 31R, 31G, and 31B drive the LED arrays 40R, 40G, and 40B, respectively, through control by the light source controller 30.

The collimator lens groups 7R, 7G, and 7B respectively shape the illumination light beams of three primary colors, red, green, and blue, sequentially emitted from the LED arrays 40R, 40G, and 40B into substantially collimated light beams. The dichroic mirrors 8R, 8G, and 8B each select the illumination light beams (fluxes of light) shaped into substantially collimated light beams and cause the selected illumination light beams to be reflected thereon or pass therethrough, to thereby compose those through one optical path. The condensing lens group 9 condenses the illumination light beams each composed into one optical path and emits those to the projection optical system 3.

The light source controller 30 controls the LED drive circuits 31R, 31G, and 31B, to thereby control the LED arrays 40R, 40G, and 40B to turn on, respectively. The light source controller 30 also serves to detect a failure in LEDs constituting the LED arrays 40R, 40G, and 40B. For example, the light source controller 30 detects the voltages of the LEDs constituting the LED arrays 40R, 40G, and 40B, to thereby detect a failure of the LED based on the detected voltages.

The projection optical system 3 includes an integration device 10, a relay lens group 11, a total internal reflection (TIR) prism 12 containing a total reflection surface, a DMD 13 (image display device), and a projection lens 20.

The integration device 10 is, for example, a light tunnel or glass rod, which uniformizes the illuminance distribution of the illumination light emitted from the condensing lens group 9 and emits those to the relay lens group 11. The relay lens group 11 is formed of lenses and reflecting mirrors, and propagates the composed light of red, green, and blue emitted from the integration device 10 to the DMD 13 through the TIR prism 12.

The DMD 13 modulates the illumination light emitted from the integration device 10 through the relay lens group 11 and the TIR prism 12 into video light and emits the video light to the projection lens 20. The projection lens 20 projects the video light emitted from the DMD 13 toward the screen.

Next, description is given of how the light source controller 30 controls the LED arrays 40R, 40G, and 40B to turn on, with reference to FIG. 1. The LED drive circuits 31R, 31G, and 31B are configured to drive each of a plurality of LED groups in the LED arrays 40R, 40G, and 40B, respectively. For example, the LED drive circuits 31R, 31G, and 31B are configured to respectively drive each of the LEDs constituting the LED arrays 40R, 40G, and 40B, and the light source controller 30 is capable of controlling each of the LEDs to turn on or off by means of the LED drive circuits 31R, 31G, and 31B, respectively.

The number of LEDs to turn on at the same time is controlled in this manner, which enables to control the brightness of a video image to be projected onto the screen. While FIG. 1 shows one LED drive circuit 31R, one LED drive circuit 31G, and one LED drive circuit 31B, description is given below assuming that as many LED drive circuits 31R, 31G, and 31B as LEDs are provided.

At least one LED among the six LEDs is turned off at first, and in a case where a failure occurs in part of the LEDs turning on, the at least one LED that has been turned off is turned on. This enables to continuously operate the projection type display 1 without decreasing the brightness of a video image projected onto the screen.

Even when a failure does not occur in the LEDs turning on, the turn-on duration per LED can be reduced by sequentially switching the LEDs to be turned on or off, leading to a longer life of the LED array.

Next, the operation of the projection type display 1 is described in detail with reference to FIG. 1. The red diverging light beam emitted from the red LED array 40R is shaped into a collimated light beam by the collimator lens group 7R for red. Then, the collimated light beam is reflected on the dichroic mirror 8R for red that reflects only a red light beam and causes light beams of the other colors to pass therethrough, and enters the condensing lens group 9 that condenses the collimated light beams.

The green diverging light beam emitted from the green LED array 40G is shaped into a collimated light beam by the collimator lens group 7G for green. Then, the collimated light beam is reflected on the dichroic mirror 8G for green that reflects only a green light beam and causes light beams of the other colors to pass therethrough, and enters the condensing lens group 9.

The blue diverging light beam emitted from the blue LED array 40B is shaped into a collimated light beam by the collimator lens group 7B for blue. Then, the collimated light beam is reflected on the dichroic mirror 8B for blue that reflects only a blue light beam and causes light beams of the other colors to pass therethrough, and enters the condensing lens group 9.

The red, green, and blue illumination light beams respectively emitted from the collimator lens groups 7R, 7G, and 7B are substantially collimated light beams until they enter the condensing lens group 9. Therefore, in a case where the red, green, and blue illumination light beams are reflected on and are caused to pass through the dichroic mirrors 8R, 8G, and 8B located at some midpoint in the optical paths thereof, the red, green, and blue illumination light beams are hardly affected by a wavelength shift due to the incident angle dependence of the dichroic mirrors 8R, 8G, and 8B.

The red, green, and blue illumination light beams that have entered the condensing lens group 9 are condensed by the condensing lens group 9, so that light source images 41R, 41G, and 41B (see FIG. 3) of the respective LED arrays 40R, 40G, and 40B are formed while being kept on the entrance surface of the integration device 10.

The red, green, and blue illumination light beams condensed on the entrance surface of the integration device 10 are repeatedly reflected inside the integration device 10 when passing therethrough, which leads to a substantially uniform illuminance distribution on the exit surface of the integration device 10. The composed light of red, green, and blue emitted from the integration device 10 is propagated through the relay lens group 11, is deflected on the total reflection surface inside the TIR prism 12, and is imaged on the DMD 13 while keeping a substantially uniform illuminance distribution on the exit surface of the integration device 10.

The tilt of the micromirror varies in response to an input signal in the DMD 13, and the composed light of red, green, and blue is modulated into video light for each color of red, green, and blue light beams in a time division manner. The video light enters the projection lens 20 after passing through the TIR prism 12, and is enlarged and projected onto the screen. Accordingly, a color video image is formed.

Figure 2:
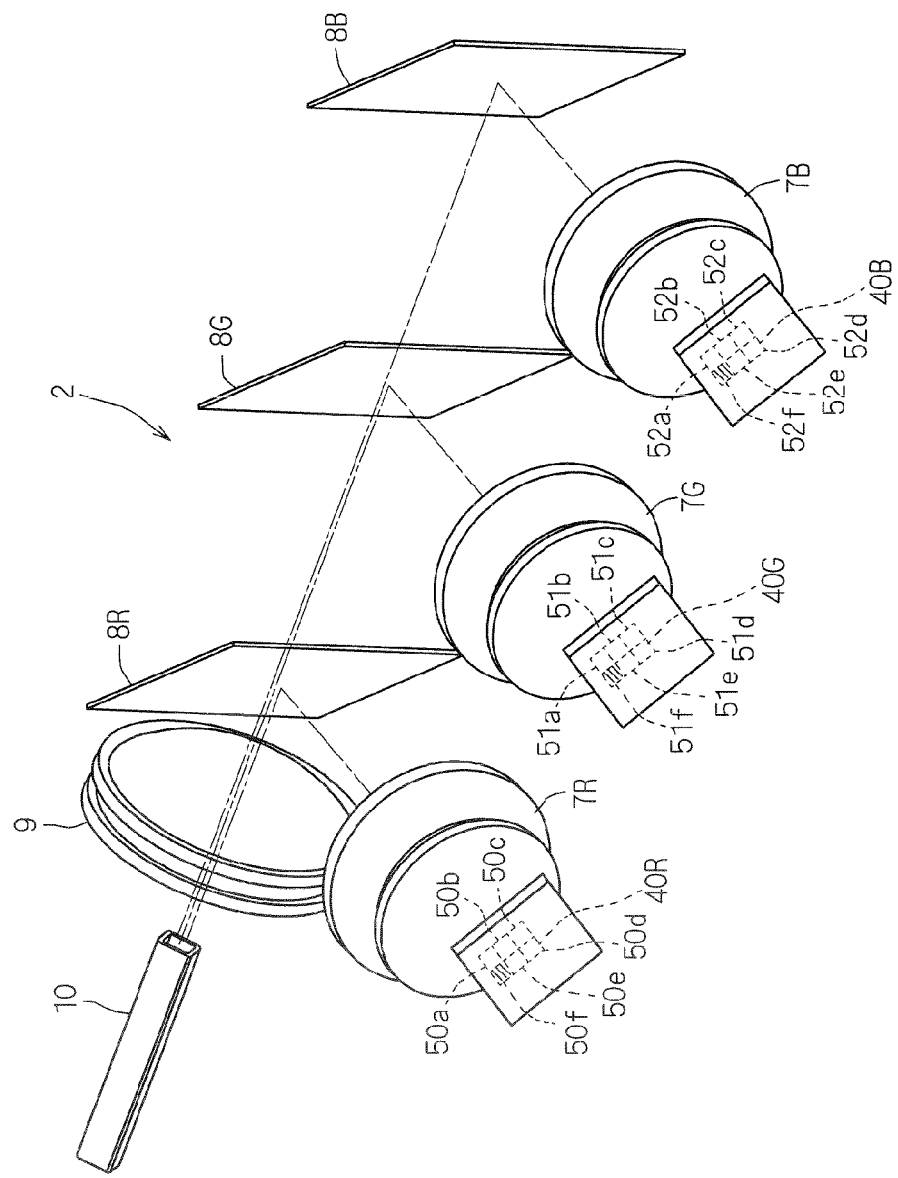
FIG. 2 is a view showing the configuration of an illumination optical system of the projection type display according to the first preferred embodiment.
Figure 3:
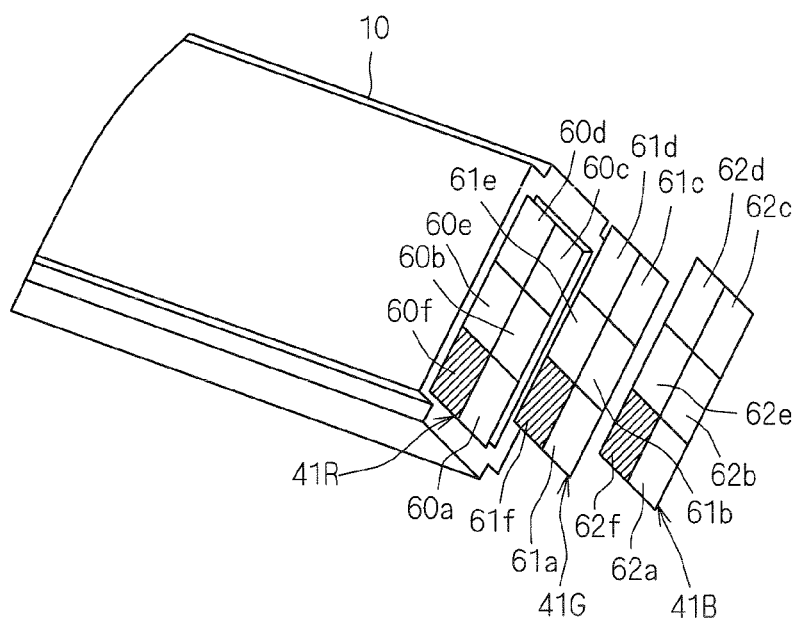
FIG. 3 is a perspective view showing an example of light source images formed on an entrance surface of an integration device of the projection type display according to the first preferred embodiment.

Next, the light source images 41R, 41G, and 41B to be formed on the entrance surface of the integration device 10 are described. FIG. 2 is a view showing the configuration of the illumination optical system 2, and FIG. 3 is a perspective view showing an example of the light source images 41R, 41G, and 41B to be formed on the entrance surface of the integration device 10.

The light source images 41R, 41G, and 41B on the exit surface of the integration device 10 are formed on the DMD 13 while keeping the illuminance distribution thereof. Therefore, the exit surface of the integration device 10, and besides, the entrance surface of the integration device 10 are caused to have a rectangular shape with the same aspect ratio as that of the DMD 13, in accordance with the rectangular shape of an effective area of the micromirror of the DMD 13. This enables efficient irradiation of the DMD 13.

In order to capture the light beams emitted from the red LED array 40R, green LED array 40G, and blue LED array 40B, each of which having a rectangular shape, into the entrance surface of the integration device 10 with a small loss, it is desirable that the shape of each of the light source images 41R, 41G, and 41B in the LED arrays 40R, 40G, and 40B and the shape of the entrance surface of the integration device 10 be at a 1:1 ratio. Here, the light source image 41R (60a to 60f) is a light source image formed by the LED array 40R (LEDs 50a to 50f), the light source image 41G (61a to 61f) is a light source image formed by the LED array 40G (LEDs 51a to 51f), and the light source image 41B (62a to 62f) is a light source image formed by the LED array 40B (LEDs 52a to 52f).

The light source controller 30 controls the LED arrays 40R, 40G, and 40B to turn on such that the respective shapes of the light source images 41R, 41G, and 41B, which are formed on the entrance surface of the integration device 10 by five LEDs (more generally, n LEDs) of the LED arrays 40R, 40G, and 40B, coincide with each other.

Specifically, as shown in FIG. 2, the light source controller 30 controls the five LEDs 50a to 50e to turn on and the one LED 50f to turn off among the six LEDs 50a to 50f of the red LED array 40R. The shape of the light source image 41R (60a to 60e) formed on the entrance surface of the integration device 10 by the LEDs 50a to 50e of the red LED array 40R is as shown in FIG. 3. The LEDs turned off are diagonally shaded.

The light source controller 30 controls the five LEDs 51a to 51e to turn on and the one LED 51f to turn off among the six LEDs 51a to 51f of the green LED array 40G, and controls the five LEDs 52a to 52e to turn on and the one LED 52f to turn off among the six LEDs 52a to 52f of the blue LED array 40B.

The shape of the light source image 41G (61a to 61e) formed on the entrance surface of the integration device 10 by the LEDs 51a to 51e of the green LED array 40G, and the shape of the light source image 41B (62a to 62e) formed on the entrance surface of the integration device 10 by the LEDs 52a to 52e of the blue LED array 40B are as shown in FIG. 3. The shapes of the light source images 41R, 41G, and 41B coincide with each other, and thus, the illumination light beams (light source images) overlap each other when red, green, and blue are composed in the same shape on the entrance surface of the integration device 10.

Although the brightness becomes uneven between the area that is irradiated with light beams and the area that is not irradiated with light beams on the entrance surface of the integration device 10, the illumination light formed through the composition of light beams of three colors, red, green, and blue, is obtained within the area that is irradiated with light beams. Therefore, the illumination light passes through the integration device 10 while being repeatedly reflected thereinside, which reduces the uneven brightness and uneven chromaticity of the illumination light on the exit surface of the integration device 10. This reduces the uneven brightness and uneven chromaticity of a video image to be projected onto the screen.

In a case where part of the LEDs cannot turn on due to a failure in the LED arrays 40R, 40G, and 40B, the light source controller 30 detects the position and number of the LED that has failed, and controls the LEDs of the other LED arrays, which are formed at the same position as the position of the light source image formed by the failed LED, not to turn on. This enables to reduce uneven brightness and uneven chromaticity even if part of the LEDs fails. For example, in a case where the LED 50f of the red LED array 40R fails in FIG. 2, the light source controller 30 controls the LED 51f of the green LED array 40G and the LED 52f of the blue LED array 40B to turn off.

Meanwhile, in a conventional device, the LEDs to turn on and turn off in LED arrays are randomly selected. Accordingly, the illumination light beams have different shapes for the respective colors and cannot coincide with each other when red, green, and blue are composed on the entrance surface of the integration device. For this reason, not only the brightness but also the chromaticity becomes uneven considerably in the illumination light beams on the entrance surface of the integration device. In order to significantly reduce uneven chromaticity by the internal reflection of the integration device, the integration device needs to be much longer in the optical axis direction, which is a major obstacle to downsizing of a projection type display. However, as described above, the projection type display 1 according to the first preferred embodiment does not cause the above-mentioned problem.

Though the case in which five LEDs are turned on and one LED is turned off among the six LEDs in each of the LED arrays 40R, 40G, and 40B is illustrated here, the same effects can be achieved as long as the illumination light beams overlap each other in the same shape when red, green, and are composed on the entrance surface of the integration device 10. Any of the six LEDs may be turned on and off, and the number thereof is not particularly limited.

In a case in which a plurality of LEDs are merely turned on and off at the same time, the light source controller 30 does not need to control LEDs one by one, and an LED drive circuit is provided for each group composed of a plurality of LEDs. This enables to simplify the circuit configuration.

While the LED arrays 40R, 40G and 40B, and the dichroic mirrors 8R, 8G and 8B are arranged in order of red, green, and blue from the side close to the condensing lens group 9 in FIGS. 1 and 2, the same effects can be achieved as long as the red, green, and blue illumination light beams enter the condensing lens group 9. It means that the arrangement order is not necessarily limited to the order of red, green, and blue. For example, the LED arrays 40R, 40G and 40B, and the dichroic mirrors 8R, 8G and 8B may be arranged in order of red, blue, and green.

As described above, in the projection type display 1 according to the first preferred embodiment, the light source controller 30 selects the number and positions of the LEDs to turn on and off in the LED arrays 40R, 40G, and 40B, and controls the LED arrays 40R, 40G, and 40B to turn on such that the shapes of the light source images 41R, 41G, and 41B, each of which is formed on the entrance surface of the integration device 10 by each of the LEDs of the LED arrays 40R, 40G, and 40B, coincide with each other. Accordingly, even in a case where part of the LEDs constituting the LED arrays 40R, 40G, and 40B is turned off, the uneven brightness and uneven chromaticity of a video image on the screen can be reduced.

In addition, the light source controller 30 detects a failure of an LED in one of the LED arrays and controls the LEDs in the others of LED arrays, the light source images of which are formed at the same position as the position of the light source image to be formed by the LED that has failed, not to turn on. This enables to control LEDs of an LED array so as to prevent the occurrences of uneven brightness and uneven chromaticity even if part of the LEDs fails.

Further, only LED arrays are used as a light source, which enables to reduce the size and power consumption of the projection type display 1 and improve the durability thereof.

Second Preferred Embodiment

Figure 4:
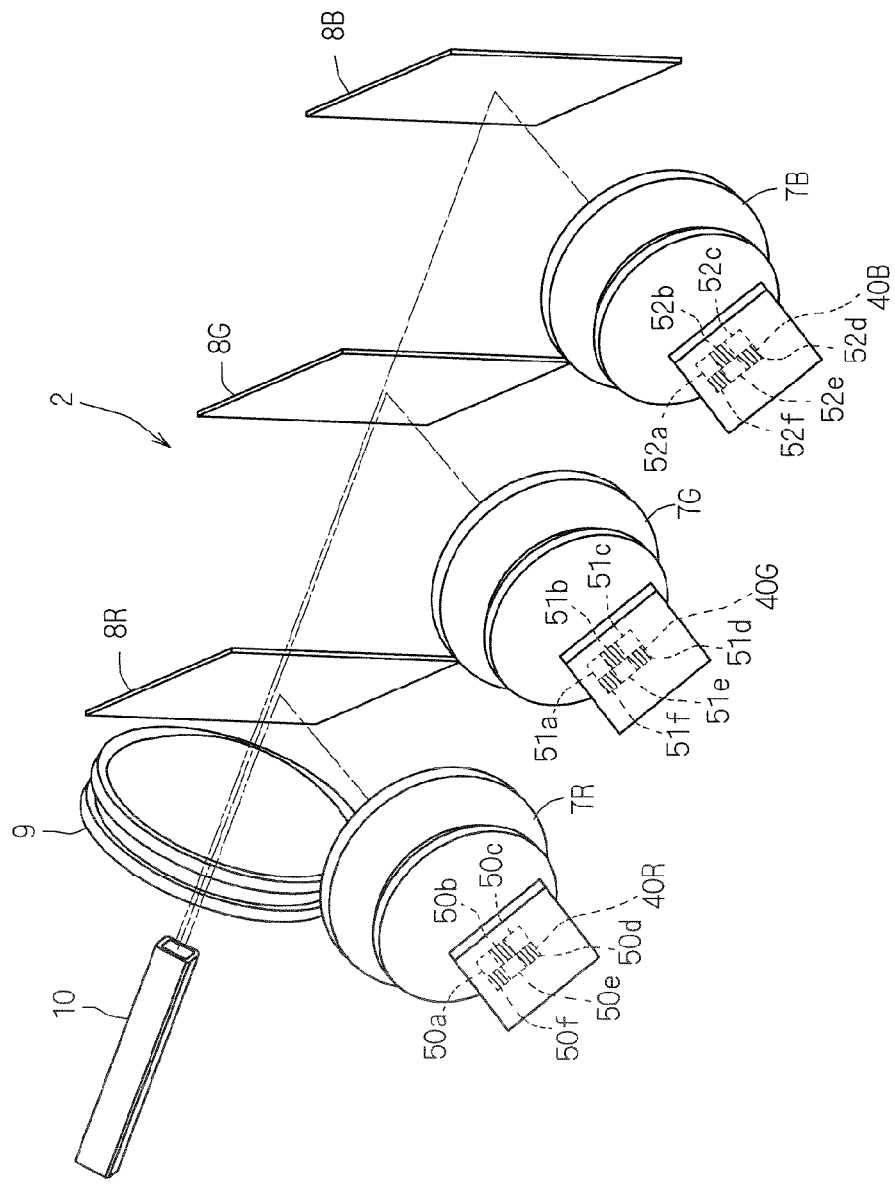
FIG. 4 is a view showing the configuration of an illumination optical system of a projection type display according to a second preferred embodiment.

Next, a projection type display 1 according to a second preferred embodiment is described. FIG. 4 is a view showing the configuration of an illumination optical system 2 of the projection type display 1 according to the second preferred embodiment, and FIG. 5 is a perspective view showing an example of light source images 41R, 41G, and 41B to be formed on an entrance surface of an integration device 10 of the projection type display 1 according to second preferred embodiment. In the second preferred embodiment, like reference symbols denote similar components described in the first preferred embodiment, which are not described here.

In the second preferred embodiment, if a plurality of LEDs are intentionally turned off for changing the brightness of a video image to be projected onto a screen or for prolonging the life of an LED array through a reduction of a turn-on duration per LED, the light source controller 30 controls, in a case where one of the LED arrays includes a plurality of LEDs that are not turned on, each of the LED arrays such that the plurality of LEDs are not unevenly distributed for achieving a shape balance among the light source images 41R, 41G, and 41B to be formed on the entrance surface of the integration device 10.

For example, the light source controller 30 controls three LEDs to intentionally turn off in each of the LED arrays 40R, 40G, and 40B. Specifically, in the case where the light source controller 30 controls the three LEDs 50a to 50c, 51a to 51c, and 52a to 52c to turn on and the three LEDs 50d to 50f, 51d to 51f, and 52d to 52f to turn off in the LED arrays 40R, 40G, and 40B, respectively, the shapes of the light source images 41R (60a to 60c), 41G (61a to 61c), and 41B (62a to 62c) to be formed on the entrance surface of the integration device 10 coincide with each other. Accordingly, the illumination light beams overlap each other when red, green, and blue are composed on the entrance surface of the integration device 10, which enables to reduce the uneven brightness and uneven chromaticity of a video image to be projected onto the screen.

However, an area irradiated with light beams is one-sided on the entrance surface of the integration device 10, leading to large uneven brightness in terms of illuminance distribution. This increases a degree of uneven brightness of a video image to be projected onto the screen through the projection lens 20. There is no choice but to further increase the length of the integration device 10 in the optical axis direction for sufficiently reducing the uneven brightness in illuminance distribution by the integration device 10. This is a major obstacle to downsizing of a display device.

Therefore, in a case where three LEDs are intentionally turned off in each of the LED arrays 40R, 40G, and 40B in the projection type display 1 according to the second preferred embodiment, as shown in FIGS. 4 and 5, the three LEDs 50a, 50c, and 50e are turned on and the three LEDs 50b, 50d, and 50f are turned off in the LED array 40R. Similarly, the three LEDs 51a, 51c, and 51e are turned on and the three LEDs 51b, 51d, and 51f are turned off in the LED array 40G, and the three LEDs 52a, 52c, and 52e are turned on and the three LEDs 52b, 52d, and 52f are turned off in the LED array 40B.

As a result, a balance in illuminance distribution among the illumination light beams of the respective colors can be achieved on the entrance surface of the integration device 10, leading to less uneven illuminance distribution on the exit surface of the integration device 10. This enables to achieve a balance in uneven brightness of a video image to be projected onto the screen.

Similar effects can be achieved also by switching LEDs to be turned on and off such that the three LEDs 50b, 50d, and 50f are turned on and the three LEDs 50a, 50c, and 50e are turned off in the LED array 40R, that the three LEDs 51b, 51d, and 51f are turned on and the three LEDs 51a, 51c, and 51e are turned off in the LED array 40G, and that the three LEDs 52b, 52d, and 52f are turned on and the three LEDs 52a, 52c, and 52e are turned off in the LED array 40B.

In the projection type display 1 according to the second preferred embodiment, as described above, in a case where there are plurality of LEDs that are not turned on in one of the LED arrays, the light source controller 30 controls each LED array to turn on such that the plurality of LEDs that are not turned on are not unevenly distributed for achieving a shape balance among the light source images 41R, 41G, and 41B to be formed on the entrance surface of the integration device 10. This enables to reduce, when a plurality of LEDs are turned off, the uneven brightness of a video image to be projected onto a screen by achieving a balance in illuminance distribution among the illumination light beams to enter the integration device 10.

Third Preferred Embodiment

Figure 6:
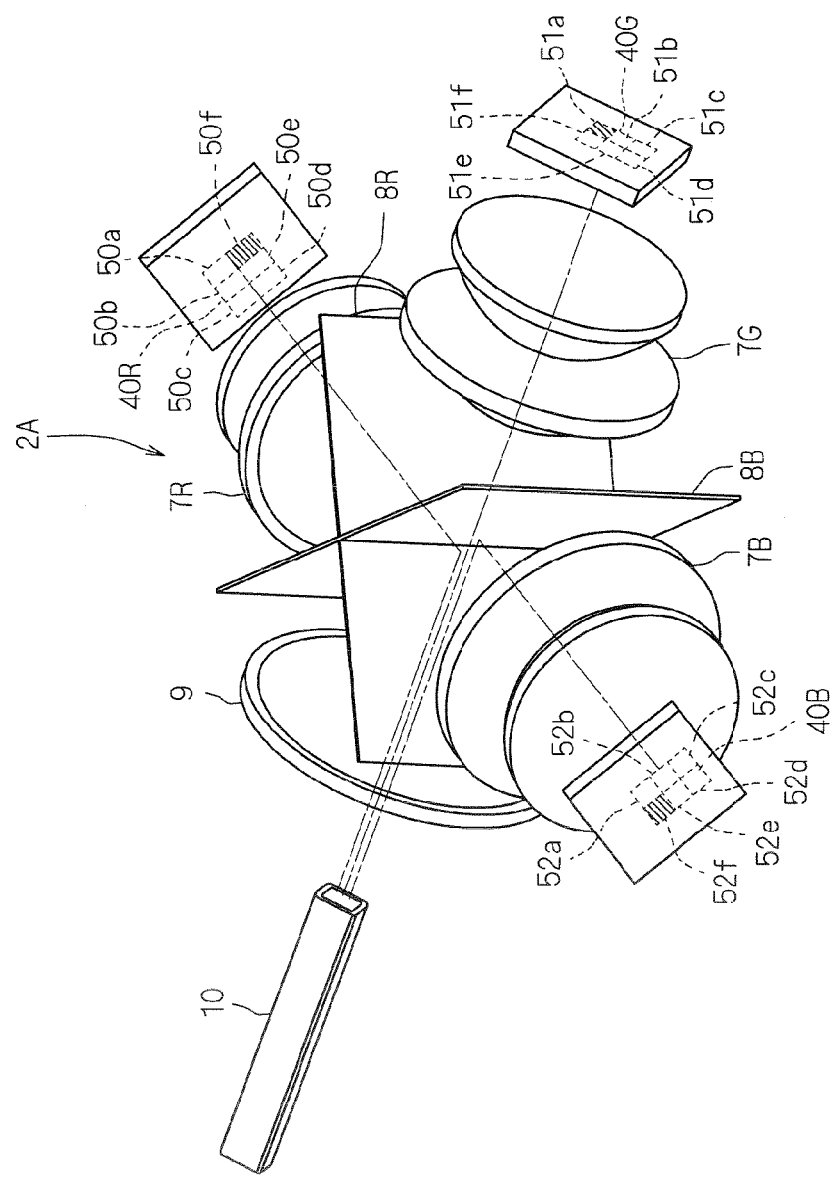
FIG. 6 is a view showing the configuration of an illumination optical system of a projection type display according to a third preferred embodiment.

Next, a projection type display 1 according to a third preferred embodiment is described. FIG. 6 is a view showing the configuration of an illumination optical system 2A of the projection type display 1 according to the third preferred embodiment, and FIG. 7 is a perspective view showing an example of light source images 41R, 41G, and 41B to be formed on an entrance surface of an integration device 10 of the projection type display 1 according to the third preferred embodiment. In the third preferred embodiment, like reference symbols denote similar components described in the first and second preferred embodiments, which are not described here.

In the third preferred embodiment, LED arrays 40R and 40B are arranged to be opposed to each other, and an LED array 40G and a condensing lens group 9 are arranged to be opposed to each other. In place of arranging dichroic mirrors 8R, 8G, and 8B in line, the dichroic mirror 8R for red and the dichroic mirror 8B for blue are arranged in a cross shape, and the dichroic mirror 8G for green is not required.

The red, green, and blue illumination light beams that have been emitted from the collimator lens groups 7R, 7G, and 7B but yet to enter the condensing lens group 9 are substantially collimated light beams. Accordingly, when the red, green, and blue illumination light beams are reflected on and pass through the dichroic mirrors 8R and 8B arranged in a cross shape at some midpoint in the optical paths thereof, the red, green, and blue illumination light beams are hardly affected by a wavelength shift due to the incident angle dependence of the dichroic mirrors 8R and 8B.

Also in this arrangement, the light source images 41R, 41G, and 41B can be formed at an approximately 1:1 ratio between the shape of each of the light source images 41R, 41G, and 41B in the LED arrays 40R, 40G, and 40B and the shape of the entrance surface of the integration device 10.

In the third preferred embodiment, the LEDs constituting the LED arrays 40R, 40G, and 40B are arranged at the positions shown in FIG. 6, and the light source images 41R (60a to 60f), 41G (61a to 61f), and 41B (62a to 62f) on the entrance surface of the integration device 10 are formed at the positions shown in FIG. 7. Here, in the light source image 41G formed by the LED array 40G, the respective light source images 61a to 61f of the LEDs 51a to 51f are formed at the positions different from those in the cases shown in FIGS. 3 and 5.

For example, in a case where the five LEDs 50a to 50e are turned on and the one LED 50f is turned off in the red LED array 40R and the five LEDs 52a to 52e are turned on and the one LED 52f is turned off in the blue LED array 40B, the five LEDs 51b to 51f are turned on and the one LED 51a is turned off in the green LED array 40G. As a result, among the LED arrays 40R, 40G, and 40B, the shapes of the light source images 41R, 41G, and 41B of the respective colors, which are formed on the entrance surface of the integration device 10 by the five LEDs turning on, coincide with each other and overlap each other. This results in reductions in the uneven brightness and uneven chromaticity on the exit surface of the integration device 10.

While the third preferred embodiment has illustrated the case in which five LEDs are turned on and one LED is turned off in each of the LED arrays 40R, 40G, and 40B, the same effects can be achieved as long as the illumination light beams overlap each other in the same shape when red, green, and blue are composed on the entrance surface of the integration device 10. Any of the six LEDs may be turned on and off, and the number thereof is not particularly limited.

While the LED arrays 40R, 40G, and 40B are arranged in order of red, green, and blue clockwise from the side close to the condensing lens group 9 when viewed from above in FIG. 6, almost the same effects can be achieved as long as the red, green, and blue illumination light beams enter the condensing lens group 9. Therefore, the arrangement order is not necessarily limited to the order of red, green, and blue. For example, the LED arrays 40B, 40G, and 40R may be arranged in order of blue, green, and red, and the dichroic mirrors 8B and 8R respectively for blue and red may be arranged in a cross shape so as to correspond to the above-mentioned arrangement.

While the invention has been shown and described in detail, the foregoing description is in all aspects illustrative and not restrictive. It is therefore understood that numerous modifications and variations can be devised without departing from the scope of the invention.

What is claimed is:

1. A projection display, comprising:
an illumination optical system provided with a light source including, for respective predetermined colors, LED arrays each formed of m LEDs, where m is an integer equal to or larger than two, the illumination optical system composing fluxes of light emitted from said LED arrays into illumination light having one optical path;
a light source controller that controls said LED arrays to turn on n LEDS of each of said LED arrays, n being an integer smaller than m;
an integration device that uniformizes the illuminance distribution of the illumination light emitted from the illumination optical system; and
an image display device that modulates the illumination light emitted from said integration device into video light,
wherein said light source controller controls said LED arrays to turn on said n LEDs in each of said LED arrays such that the shapes of light source images formed on an entrance surface of said integration device coincide with each other.

2. The projection display according to claim 1, wherein said light source controller detects a failure of an LED in one of said LED arrays, and controls the LED in the other of said LED arrays not to turn on, such that the light source image of the LED in the other of said LED arrays is formed at the same position as the position of the light source image formed by said LED array with the failed LED.

3. The projection display according to claim 1, wherein said light source controller controls, in a case where m-n is greater than one, each of said LED arrays to turn on the n LEDs such that the n LEDs turned on are evenly distributed for achieving a shape balance among the light source images to be formed on the entrance surface of said integration device.

* * * * *